June 20, 1950 B. B. LENHART ET AL 2,512,107
NUT SHELLING APPARATUS OF THE PNEUMATIC TYPE
Filed Jan. 27, 1947
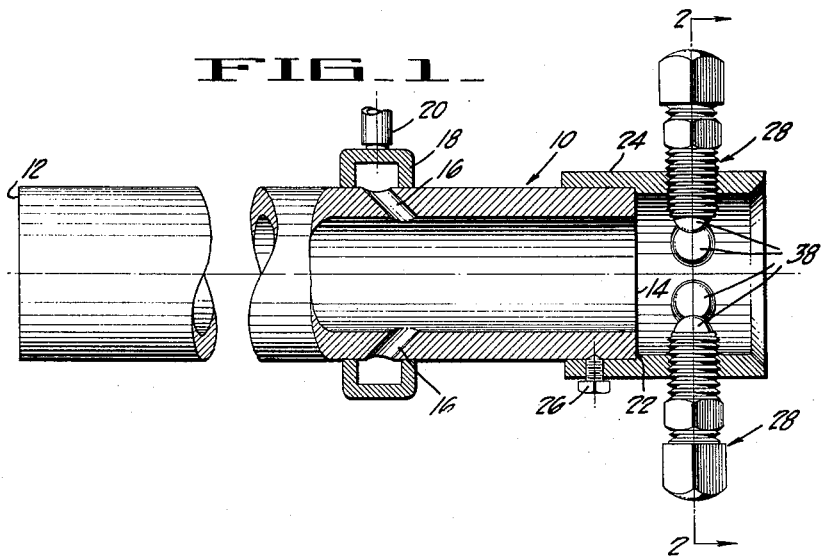
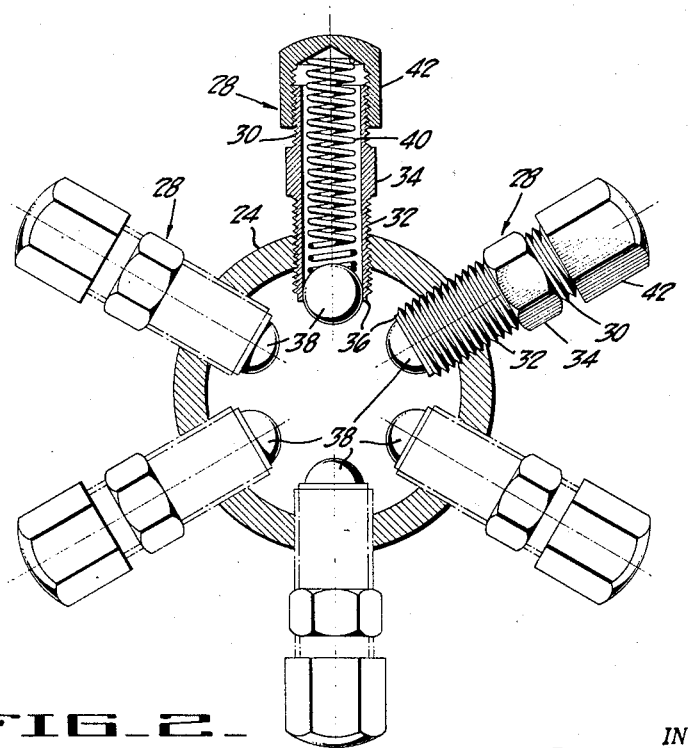
INVENTORS
Bernard B. Lenhart
Marshall W. McGrath
BY
ATTORNEYS Patented June 20, 1950

2,512,107

UNITED STATES PATENT OFFICE 2,512,107

NUT SHELLING APPARATUS OF THE PNEUMATIC TYPE

Bernard B. Lenhart, Mill Valley, and Marshall W. McGrath, San Francisco, Calif.

Application January 27, 1947, Serial No. 724,494

3 Claims. (Cl. 146—8)

This invention relates to a nut shelling apparatus, and more particularly to a device adapted to fracture the shells of nuts as the nuts are passed therethrough.

This application is a continuation in part of our co-pending application entitled "Nut Shelling Apparatus of the Pneumatic Type," Serial Number 703,029, filed October 12, 1946, now abandoned, wherein there is described and claimed an apparatus for shelling nuts comprising a tube and target in spaced alignment, and a plurality of ports through the wall of the tube adapted to allow for the passage of pressurized air and the direction of said air toward the mouth of the tube adjacent the target. Into the opposite or high pressure end of the tube, there is passed a succession of nuts which are driven by the pressure differential against the target with shell fracturing force. The structure embodying the instant invention comprises the tube structure above-described, but the target is supplanted by an improved shell fracturing element comprising a sleeve attachable to the mouth of the tube in concentric relation therewith, said sleeve having a plurality of inwardly and radially extending spring urged members, each separately extensible and adjustably spring loaded, adapted to provide for a predetermined degree of fracture of the shells of variously sized nuts as the nuts are propelled through the collar and forced past the converging ends of the spring loaded members.

Among the objects of the invention, therefore, are the following: To provide an improved and more efficient nut shelling element for association with means for propelling nuts therethrough; to provide a nut shelling element whereby the effective shell fracturing force is proportional to the kinetic energy of movement of the nuts through the element; and to provide a nut shelling element which is adjustable to the size and shape of the species of nut to be processed and also adjustable to impart a variable shell breaking force to the nuts as they are passed therethrough.

Other objects and avantages of the invention will be apparent from the following description taken in conjunction with the drawing forming part of this specification, and in which:

Figure 1 is a view in section of a nut shelling apparatus embodying the improved nut shelling element of the invention; and Figure 2 is a view in section taken along lines 2—2 of Figure 1.

Referring to the drawing for more specific details of the invention, 10 is a tube having an inlet 12, an outlet 14, and a plurality of passages 16 angularly inclined toward the outlet 14. A manifold 18 is secured to the tube 10 in overlying relation to the passages 16, and a conduit 20 connects said manifold with a source of pressurized air, not shown. The outlet end of the tube 10 abuts a shoulder 22 of an extension tube or sleeve 24, said sleeve being secured to the tube by a set screw 26. A plurality of pipe nipples 28, having upper and lower externally threaded portions 30 and 32 spaced apart by a wrench gripping surface, such as an hexagonal head 34, are threaded through the sleeve 24 in radially spaced relation. Each of the nipples 28 has an inwardly crimped end 36 to retain therein a steel ball 38 of slightly less diameter than the inner diameter of the nipple, said balls being yieldingly urged against the crimped ends of the nipples by springs 40 abutting caps 42 adjustably threaded on the upper portions 30 of the nipples.

When pressurized air is passed into the manifold 18 and through the passages 16 to issue from the sleeve 24, a pressure differential is set up between the inlet 12 of the tube 10 and the outlet 14 of the tube, said pressure differential being effective to impel a nut, placed within the inlet 12 of the tube, through the tube to strike the balls 38 which are subtended by the inner diameter of the tube 10. The balls 38 are urged inwardly of the nipples 28 by the impact of the nut to allow the passage of the nut through the sleeve 24, but said impact is effective to fracture the shell of the nut to a degree proportional to the velocity of the nut and the degree of compression of the springs 40 acting in opposition to the inward movement of the balls with respect to the nipples 28. The distance between the ends of oppositely disposed nipples 28 is maintained greater than the inside diameter of the tube 10 to prevent the nuts from striking the nipples as they are passed through the sleeve 24.

Species of nuts of varied size and shell strength may be processed to obtain optimum shell fracturing by extending the nipples 28 inwardly of sleeve 24 by means of a wrench applied to the hexagonal surface 34 or retracting the nipples outwardly in a similar manner to accommodate the space described by the ends of the balls 38 to nuts of varied size, and the fracturing of the shells may be controlled by a variation of the pressure of the air admitted to manifold 18 to regulate the velocity of the nuts in passing through the tube 10, and by adjusting the caps 42 to control the degree of compression of springs 40 and, hence, the reactive or shell breaking effect of the balls 38.

The tube 10 in Figure 1 is adapted to have efficiently propelled therethrough nuts of a size comparable to the inner diameter of the tube. It is intended that a tube liner or shim be inserted and secured in tube 10 to adapt the tube for the efficient passing therethrough of nuts of smaller size, said liners being of variable wall thickness so that the inner diameter of a particular liner is comparable to the size of a nut of particular species. The nipples 28 are then adjusted so that the inner diameter of the liner subtends the ends of the balls 38, as in Figure 1.

It is, of course, obvious that the number of balls 38 used in the shell fracturing process may be lessened to a desired number of retracting the remaining nipples so that the balls carried thereby are not in the path of the nuts passing through the sleeve 24. Also, it is to be pointed out that the nipples 28 may be individually adjusted so that the balls 38 form an asymmetrical pattern to thus achieve a variegated shell fracturing.

A further consideration to be noted is the fact that the springs 40 may be replaced by equivalent resilient means, such as a rubber cushion, pressurized air, or the like, and, also, that any suitable mechanism may be provided to achieve a simultaneous adjustment of all the nipples 28 to uniformly vary in one operation the degree in which the nipples extend within the sleeve 24.

While the preferred embodiment of the invention has been shown and described, the embodiment is subject to modification within the spirit of the invention and the scope of the appended claims.

What we claim as new and desire to secure by Letters Patent is:

1. A nut shelling apparatus comprising tubular guide means for a nut, a plurality of spring-loaded roller members extending radially within the bore of said tubular guide means, said members being movable yieldingly outwardly with respect to said guide means and being independently movable with respect to each other, and propelling means adapted to impart a relatively high velocity to a nut and cause it to travel through said guide means, said moving nut being operable to strike said roller members and force said members out of the path of travel of said nut to allow movement of the nut therepast, and said members being adapted to travel on the surface of said nut while said nut is moving between said members to fracture the shell of said nut.

2. The nut shelling apparatus set forth in claim 1, wherein there is provided pneumatic propelling means, control means to vary the propulsion effect of said propelling means, control means to vary the bore positioning of said roller members, and control means to vary the spring-loading of said members, whereby through the desired setting of said control means nuts of various sizes may be accommodated and the degree of shell fracture may be varied.

3. A nut shelling apparatus comprising a tube, means associated therewith for introducing compressed air into said tube for the propelling of nuts along said tube, and a plurality of circumferentially spaced independently movable members separate from but associated with the outlet end of the tube extending radially into the path of a nut propelled by said air and yieldingly movable outwardly of said path, under the shell-fracturing impact thereagainst of a propelled nut, to allow for continued movement of said nut past said members, the inside area defined by the convergence of the spaced members being less than the inside diametral area of the tube.

BERNARD B. LENHART.
MARSHALL W. McGRATH.

REFERENCES CITED

The following references are of record in the file of this patent:

UNITED STATES PATENTS

| Number | Name | Date |
| --- | --- | --- |
| 947,932 | Peckham | Feb. 1, 1910 |
| 1,046,290 | Granville | Dec. 3, 1912 |
| 1,234,697 | Foote | July 24, 1917 |
| 2,131,290 | Kochner et al. | Sept. 27, 1938 |
| 2,154,412 | Romberg et al. | Apr. 11, 1939 |
| 2,212,213 | Rothenberger et al. | Aug. 20, 1940 |
| 2,234,157 | Jones | Mar. 4, 1941 |
| 2,381,288 | Jones | Aug. 7, 1945 |
| 2,386,975 | Pearce et al. | Oct. 16, 1945 |